United States Patent
Jung et al.

(10) Patent No.: US 9,434,838 B2
(45) Date of Patent: Sep. 6, 2016

(54) MULTI-COLOR INK FOR 3D PRINTING, 3D PRINTER, AND METHOD OF CONTROLLING THE 3D PRINTER

(71) Applicant: SAMSUNG ELECTRONICS CO., LTD., Suwon-si, Gyeonggi-do (KR)

(72) Inventors: Yeon Kyoung Jung, Seoul (KR); O Hyun Beak, Seoul (KR); Keon Kuk, Yongin-si (KR); Eun Bong Han, Suwon-si (KR); Yong Hyun Lim, Suwon-si (KR); Jong Youb Ryu, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/502,072

(22) Filed: Sep. 30, 2014

(65) Prior Publication Data

US 2015/0094394 A1     Apr. 2, 2015

(30) Foreign Application Priority Data

Oct. 2, 2013   (KR) .................. 10-2013-0118190
Aug. 25, 2014  (KR) .................. 10-2014-0110890

(51) Int. Cl.

| | |
|---|---|
| G03G 9/097 | (2006.01) |
| B29C 71/04 | (2006.01) |
| C08F 2/46 | (2006.01) |
| C08G 61/04 | (2006.01) |
| C08L 33/08 | (2006.01) |
| B05C 5/00 | (2006.01) |
| B33Y 30/00 | (2015.01) |
| B05D 5/00 | (2006.01) |
| C09D 11/101 | (2014.01) |
| C09D 11/38 | (2014.01) |
| C09D 11/40 | (2014.01) |
| C09D 11/54 | (2014.01) |

(52) U.S. Cl.
CPC .................. *C08L 33/08* (2013.01); *B05C 5/00* (2013.01); *B05D 5/00* (2013.01); *B33Y 30/00* (2014.12); *C09D 11/101* (2013.01); *C09D 11/38* (2013.01); *C09D 11/40* (2013.01); *C09D 11/54* (2013.01); C08L 2205/025 (2013.01)

(58) Field of Classification Search
CPC .. C08L 33/08; C08L 2205/025; C09D 11/54; C09D 11/101; C09D 11/40; B33Y 30/00; B05C 5/00; B05D 5/00; B29C 67/00
USPC ............... 522/75, 74, 71, 1, 189, 184; 520/1
See application file for complete search history.

(56) References Cited

U.S. PATENT DOCUMENTS

| | | | |
|---|---|---|---|
| 5,851,274 | A | 12/1998 | Lin |
| 6,306,204 | B1 | 10/2001 | Lin |
| 7,169,218 | B2 | 1/2007 | Pallen et al. |
| 7,989,032 | B2 | 8/2011 | Louwet et al. |
| 2006/0025498 | A1* | 2/2006 | Fukushige ............ C03C 17/006 523/160 |
| 2006/0139425 | A1 | 6/2006 | Tsuchimura et al. |
| 2012/0231232 | A1 | 9/2012 | Xu et al. |

FOREIGN PATENT DOCUMENTS

| | | |
|---|---|---|
| EP | 0 586 079 A1 | 3/1994 |
| EP | 1 491 322 A2 | 12/2004 |
| EP | 1681323 A1 | 7/2006 |
| EP | 2 070 998 A1 | 6/2009 |
| EP | 2 641 942 A1 | 9/2013 |
| JP | 2004-211095 | 7/2004 |
| JP | 2006-241218 | 9/2006 |
| JP | 2006-249353 | 9/2006 |
| JP | 2009-221283 | 10/2009 |
| KR | 10-2007-0032109 | 3/2007 |
| KR | 10-2008-0035944 | 4/2008 |
| KR | 10-2009-0004054 | 1/2009 |
| WO | 02/064689 A2 | 8/2002 |
| WO | 2006/104281 A1 | 10/2006 |

OTHER PUBLICATIONS

Extended European Search Report dated Apr. 29, 2015 in corresponding European Patent Application No. 14187358.8.
International Search Report mailed Dec. 26, 2014 in related International Application No. PCT/KR2014/009329.
Partial European Search Report mailed Jan. 12, 2015 in related European Application No. 14187358.8.
Office Action mailed Apr. 22, 2016 in European Patent Application No. 14 187 358.8.

* cited by examiner

*Primary Examiner* — Ling Choi
*Assistant Examiner* — Jessica E Whiteley
(74) *Attorney, Agent, or Firm* — Staas & Halsey LLP (57) ABSTRACT

A multi-color ink for 3D printing, a 3D printer, and a method of controlling the 3D printer are provided. The multi-color ink for 3D printing including a first ink composition that includes a photocurable material, a photoinitiator configured to cure the photocurable material, a first colorant, and an anti-intercolor bleed agent configured to prevent intercolor bleeding occurring when the plurality of ink compositions come into contact with each other, and a second ink composition that includes a photocurable material, a photoinitiator configured to cure the photocurable material, and a second colorant having an acid moiety involved in a reaction with the anti-intercolor bleed agent to cause aggregation. The multi-color ink for 3D printing may enable a clear image by inhibiting intercolor bleeding that occurs when ink compositions with different colors are printed to be adjacent to each other before curing during 3D printing.

22 Claims, 4 Drawing Sheets

MULTI-COLOR INK FOR 3D PRINTING, 3D PRINTER, AND METHOD OF CONTROLLING THE 3D PRINTER

CROSS-REFERENCE TO RELATED APPLICATIONS

This application is related to, and claims the priority benefit of, Korean Patent Application No. 10-2013-0118190, filed on Oct. 2, 2013 and Korean Patent Application No. 10-2014-0110890, filed on Aug. 25, 2014 in the Korean Intellectual Property Office, the disclosure of which are incorporated herein by reference.

BACKGROUND

1. Field

Embodiments of the present disclosure relate to multi-color inks for 3D printing, 3D printers, and methods of controlling the 3D printers, and more particularly, to multi-color inks for 3D printing capable of inhibiting intercolor bleeding among a plurality of colors contained in the multi-color inks.

2. Description of the Related Art

A 3D printing converting Computer Aided Design (CAD) output data into a 3D object may be performed using a CAD solid modeling system. A 3D printing may be generally performed by stacking 2D layers on a layer-by-layer and point-by-point basis.

The 3D printing techniques may be classified into liquid-based techniques, powder-based techniques, and solid-based techniques according to properties of source materials. Examples of the liquid-based techniques include Stereolithography (SLA), Jetted Photopolymer Printing, and Ink Jet Printing. Ink Jet Printing may be classified into Thermal Bubble Printing and Micro Piezo Printing in accordance with methods of printing ink. According to Thermal Bubble Printing, a heating wire or heating device is attached to a nozzle for jetting ink and vaporizes ink to make bubbles by instantly increasing temperature up to hundreds of degrees. Due to increased pressure, ink bubbles pop out of the nozzle. According to Micro Piezo Printing, an ultrafine piezoelectric device is mounted on a nozzle for jetting ink and applies physical pressure such as electrical vibration thereto, thereby jetting ink.

The 3D printing may be performed on a layer-by-layer or point-by-point basis. As an example, a layer-by-layer stacking method may be defined as where one layer is formed and cured, and then another layer is stacked thereon. When different color inks are printed onto the same layer to be adjacent to each other to realize a 3D image, an intercolor bleeding phenomenon, in which colors are intermixed at an interface thereof, may occur. Thus, it is difficult to realize a clear image.

SUMMARY

It is an aspect of an exemplary embodiment of the present disclosure to provide a multi-color ink for 3D printing including a plurality of ink compositions and capable of preventing an intercolor bleeding phenomenon in which the ink compositions are undesirably mixed at an interface thereof.

Additional aspects of the disclosure are set forth in part in the description which follows and, in part, will be obvious from the description, or may be learned by practice of the disclosure.

In accordance with an aspect of the present disclosure, a multi-color ink for 3D printing includes a plurality of ink compositions including a first ink composition and a second ink composition. The first ink composition includes at least one photocurable material, a photoinitiator configured to cure the photocurable material, a first colorant, and an anti-intercolor bleed agent configured to prevent intercolor bleeding occurring when the plurality of ink compositions come into contact with each other, and the second ink composition includes at least one photocurable material, a photoinitiator configured to cure the photocurable material, and a second colorant having an acid moiety involved in a reaction with the anti-intercolor bleed agent to cause aggregation.

The anti-intercolor bleed agent may be an amide compound represented by the following Formula 1:

[Formula 1]

In Formula 1, $R_1$ to $R_4$ are, each independently, hydrogen, a substituted or unsubstituted C1-C20 alkyl group, a substituted or unsubstituted C1-C20 heteroalkyl group, a substituted or unsubstituted C2-C20 alkenyl group, a substituted or unsubstituted C1-C20 alkoxy group, a substituted or unsubstituted C1-C20 alkylsulfoneamide group, a substituted or unsubstituted C6-C20 arylsulfoneamide group, a substituted or unsubstituted C1-C20 acylamino group, a C1-C20 alkylureido group, a C6-C20 arylureido group, a C2-C20 alkoxycarbonyl group, a C2-C20 alkoxycarbonylamino group, a carbamoyl group, a sulfamoyl group, a sulfo group and a salt thereof, a carboxyl group and a salt thereof, a substituted or unsubstituted C1-C20 hydroxyalkyloxyalkyl group, a substituted or unsubstituted C1-C20 dialkylaminoalkyl group, a substituted or unsubstituted C6-C20 pyridylalkyl group, a substituted or unsubstituted C5-C20 pyridyl group, a substituted or unsubstituted C6-C20 imidazolyl group, a hydrazine group, a hydrazone group, a substituted or unsubstituted C1-C20 pyridylalkyl group, a substituted or unsubstituted C6-C20 aryl group, a substituted or unsubstituted C6-C20 arylalkyl group, a substituted or unsubstituted C6-C20 heteroaryl group, a substituted or unsubstituted C6-C20 heteroarylalkyl group, a substituted or unsubstituted C6-C20 heteroarylalkenyl group, or a substituted or unsubstituted C3-C20 heterocycloalkyl group. $R_3$ and $R_4$ may be connected to each other to form a substituted or unsubstituted C1-C20 alkylene group, wherein at least one of the $R_1$ to $R_4$ includes an acrylate group or methacrylate group at one end thereof.

The anti-intercolor bleed agent may be an amide compound represented by the following Formula 2:

[Formula 2]

In Formula 2, R1 and R2 may be as defined with reference to Formula 1. At least one of R1 and R2 may include an acrylate group or methacrylate group at one end thereof.

In Formula 2, n is an integer of 2 to 6, m is an integer of 0 to 6, and X is hydrogen, a substituted or unsubstituted C1-C20 alkyl group, a substituted or unsubstituted C1-C20 heteroalkyl group, a substituted or unsubstituted C2-C20 alkenyl group, a substituted or unsubstituted C1-C20 alkoxy group, a substituted or unsubstituted C1-C20 alkylsulfoneamide group, a substituted or unsubstituted C6-C20 arylsulfoneamide group, a substituted or unsubstituted C1-C20 acrylamino group, a C1-C20 alkylureido group, a C6-C20 arylureido group, a C2-C20 alkoxycarbonyl group, a C2-C20 alkoxycarbonylamino group, a carbamoyl group, a sulfamoyl group, a sulfo group and a salt thereof, a carboxyl group and a salt thereof, a substituted or unsubstituted C1-C20 hydroxyalkyloxyalkyl group, a substituted or unsubstituted C1-C20 dialkylaminoalkyl group, a substituted or unsubstituted C6-C20 pyridylalkyl group, a substituted or unsubstituted C5-C20 pyridyl group, a substituted or unsubstituted C6-C20 imidazolyl group, a hydrazine group, a hydrazone group, a substituted or unsubstituted C1-C20 pyridylalkyl group, a substituted or unsubstituted C6-C20 aryl group, a substituted or unsubstituted C6-C20 arylalkyl group, a substituted or unsubstituted C6-C20 heteroaryl group, a substituted or unsubstituted C6-C20 heteroarylalkyl group, a substituted or unsubstituted C6-C20 heteroarylalkenyl group, or a substituted or unsubstituted C3-C20 heterocycloalkyl group.

The anti-intercolor bleed agent may be a cycloamine compound.

The cycloamine compound may be a pyrrole derivative, a pyridine derivative, a quinoline derivative, an isoquinoline derivative, a pyrrolidine derivative, or a piperidine derivative.

The acid moiety of the second colorant may be a carboxylate group, a sulfonate group, a phosphate group, or a salt thereof.

A content of at least one of the first colorant and the second colorant may be in the range of about 0.01 to about 1% by weight based on a weight of the first ink composition or the second ink composition.

The anti-intercolor bleed agent may be contained in an amount about 0.5 to about 10 times molar ratio of the acid moiety of the second colorant.

The photocurable material may be an acrylate-based or methacrylate-based compound having at least one unsaturated functional group.

The photocurable material may include at least one compound selected from the group consisting of a hydroxyl group-containing acrylate-based compound, a water-soluble acrylate-based compound, a polyester acrylate-based compound, a polyurethane acrylate-based compound, an epoxy acrylate-based compound, and a caprolactone-modified acrylate-based compound.

At least one of the first ink composition and the second ink composition may include a co-solvent.

At least one of the first colorant and the second colorant may comprise a dye, a pigment, a self-dispersing pigment, or a mixture thereof.

In accordance with an aspect of the present disclosure, a multi-color ink for 3D printing includes one or more ink compositions, and the one or more ink compositions include at least one photocurable material having an acrylate or methacrylate functional group, a photoinitiator configured to cure the photocurable material, a first colorant, and an anti-intercolor bleed agent configured to prevent intercolor bleeding occurring when the one or more ink compositions come into contact with each other.

The anti-intercolor bleed agent may be an amide compound represented by the following Formula 1:

[Formula 1]

In Formula 1, R1 to R4 are, each independently, hydrogen, a substituted or unsubstituted C1-C20 alkyl group, a substituted or unsubstituted C1-C20 heteroalkyl group, a substituted or unsubstituted C2-C20 alkenyl group, a substituted or unsubstituted C1-C20 alkoxy group, a substituted or unsubstituted C1-C20 alkylsulfoneamide group, a substituted or unsubstituted C6-C20 arylsulfoneamide group, a substituted or unsubstituted C1-C20 acylamino group, a C1-C20 alkylureido group, a C6-C20 arylureido group, a C2-C20 alkoxycarbonyl group, a C2-C20 alkoxycarbonylamino group, a carbamoyl group, a sulfamoyl group, a sulfo group and a salt thereof, a carboxyl group and a salt thereof, a substituted or unsubstituted C1-C20 hydroxyalkyloxyalkyl group, a substituted or unsubstituted C1-C20 dialkylaminoalkyl group, a substituted or unsubstituted C6-C20 pyridylalkyl group, a substituted or unsubstituted C5-C20 pyridyl group, a substituted or unsubstituted C6-C20 imidazolyl group, a hydrazine group, a hydrazone group, a substituted or unsubstituted C1-C20 pyridylalkyl group, a substituted or unsubstituted C6-C20 aryl group, a substituted or unsubstituted C6-C20 arylalkyl group, a substituted or unsubstituted C6-C20 heteroaryl group, a substituted or unsubstituted C6-C20 heteroarylalkyl group, a substituted or unsubstituted C6-C20 heteroarylalkenyl group, or a substituted or unsubstituted C3-C20 heterocycloalkyl group, and R3 and R4 are connected to each other to form a substituted or unsubstituted C1-C20 alkylene group, wherein at least one of the R1 to R4 includes an acrylate group or methacrylate group at one end thereof.

The anti-intercolor bleed agent may be a cycloamine compound.

The cycloamine compound may be a pyrrole derivative, a pyridine derivative, a quinoline derivative, an isoquinoline derivative, a pyrrolidine derivative, or a piperidine derivative.

The photocurable material may be a copolymer formed via polymerization of at least two types of acrylate or methacrylate monomers.

The one or more ink compositions may include a co-solvent.

The first colorant may be a dye, a pigment, a self-dispersing pigment, or a mixture thereof.

The multi-color ink for 3D printing may include a separate ink composition, different from the one or more ink compositions, including a second colorant involved in a reaction with the anti-intercolor bleed agent to generate aggregates.

The second colorant may include an acid moiety, and the acid moiety may be a carboxylate group, a sulfonate group, a phosphate group, or a salt thereof.

A content of the second colorant may be in the range of about 0.01 to about 1% by weight based on the separate ink composition, and a molar ratio of the anti-intercolor bleed agent to the acid moiety of the second colorant may be about 0.5:1 to about 10:1.

In accordance with another aspect of the present disclosure, a 3D printer includes one or more print heads, a stage on which compositions ejected from the one or more print heads are stacked, first compositions accommodated in the one or more print heads, and an anti-intercolor bleed agent to prevent intercolor bleeding among the first compositions accommodated in the one or more print heads.

The first compositions and the anti-intercolor bleed agent may be accommodated in one print head The first composition may be accommodated in a first print head, and the anti-intercolor bleed agent is accommodated in a second print head.

In accordance with an aspect of the present disclosure, a method of controlling a 3D printer including one or more print heads and a stage on which compositions ejected from the print heads are stacked, the method including supplying first compositions to be stacked on the stage to one or more first print heads, supplying a second composition including an anti-intercolor bleed agent to prevent intercolor bleeding among the first compositions to a second print head, and selectively ejecting the first compositions and the second composition respectively supplied to the first print heads and the second print head.

The anti-intercolor bleed agent may be an amide compound represented by the following Formula 1:

[Formula 1]

In Formula 1, R1 to R4 are, each independently, hydrogen, a substituted or unsubstituted C1-C20 alkyl group, a substituted or unsubstituted C1-C20 heteroalkyl group, a substituted or unsubstituted C2-C20 alkenyl group, a substituted or unsubstituted C1-C20 alkoxy group, a substituted or unsubstituted C1-C20 alkylsulfoneamide group, a substituted or unsubstituted C6-C20 arylsulfoneamide group, a substituted or unsubstituted C1-C20 acylamino group, a C1-C20 alkylureido group, a C6-C20 arylureido group, a C2-C20 alkoxycarbonyl group, a C2-C20 alkoxycarbonylamino group, a carbamoyl group, a sulfamoyl group, a sulfo group and a salt thereof, a carboxyl group and a salt thereof, a substituted or unsubstituted C1-C20 hydroxyalkyloxyalkyl group, a substituted or unsubstituted C1-C20 dialkylaminoalkyl group, a substituted or unsubstituted C6-C20 pyridylalkyl group, a substituted or unsubstituted C5-C20 pyridyl group, a substituted or unsubstituted C6-C20 imidazolyl group, a hydrazine group, a hydrazone group, a substituted or unsubstituted C1-C20 pyridylalkyl group, a substituted or unsubstituted C6-C20 aryl group, a substituted or unsubstituted C6-C20 arylalkyl group, a substituted or unsubstituted C6-C20 heteroaryl group, a substituted or unsubstituted C6-C20 heteroarylalkyl group, a substituted or unsubstituted C6-C20 heteroarylalkenyl group, or a substituted or unsubstituted C3-C20 heterocycloalkyl group, and R3 and R4 are connected to each other to form a substituted or unsubstituted C1-C20 alkylene group, wherein at least one of the R1 to R4 includes an acrylate group or methacrylate group at one end thereof.

The anti-intercolor bleed agent may be a cycloamine compound.

The first compositions may include at least one photocurable material, a photoinitiator configured to cure the photocurable material, a first colorant, and the anti-intercolor bleed agent.

The second composition may include at least one photocurable material, a photoinitiator configured to cure the photocurable material, and a second colorant having an acid moiety involved in a reaction with the anti-intercolor bleed agent to cause aggregation.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Reference will now be made in detail to the embodiments of the present disclosure, examples of which are illustrated in the accompanying drawings, wherein like reference numerals refer to like elements throughout.

A multi-color ink for 3D printing according to an embodiment of the present disclosure includes at least one ink composition. Hereinafter, a multi-color ink including a first ink composition and a second ink composition are by way of example, without being limited thereto.

The first ink composition may include at least one photocurable material, a photoinitiator configured to cure the photocurable material, a first colorant, and an anti-intercolor bleed agent configured to prevent intercolor bleeding that occurs when ink compositions come into contact with each other. The second ink composition may include at least one photocurable material, a photoinitiator configured to cure the photocurable material, and a second colorant having an acid moiety involved in a reaction with the anti-intercolor bleed agent to cause aggregation The photocurable material may be an acrylate-based or methacrylate-based compound having an unsaturated functional group. The photocurable material may include at least one compound selected from the group consisting of a hydroxyl group-containing acrylate-based compound, a water-soluble acrylate-based compound, a polyester acrylate-based compound, a polyurethane acrylate-based compound, an epoxy acrylate-based compound, and a caprolactone-modified acrylate-based compound

The photocurable material may be a copolymer formed via polymerization of at least two types of acrylate or methacrylate monomers.

The photoinitiator may be any compound capable of generating radicals by radiation of ultraviolet (UV) or visible light without limitation. Particularly, the photoinitiator may be an α-hydroxyketone-based photocuring agent, a phenylglyoxylate-based photocuring agent, and a bisacylphosphine-based photocuring agent, or an α-aminoketone-based photocuring agent. Examples of the photoinitiator may include 1-hydroxy-cyclohexyl-phenyl-ketone, a mixture of oxy-phenyltcetic acid 2-[2-oxo-2-phenyl-acetoxyethoxy]-ethyl ester and oxy-phenyl-acetic acid 2-[2-hydroxy-ethoxy]-ethyl ester, bis(2,4,6-trimethylbenzoyl) phenylphosphine oxide, 2-hydroxy-2-methyl-1-phenyl-1-propanone, and 2-methyl-1-[4-(methylthio)phenyl-2-(4-morpholinyl)-1-propanone.

The photoinitiator used in the ink composition according to an exemplary embodiment may be a single compound or a mixture of two or more types of compounds.

The anti-intercolor bleed agent may be an amide compound represented by the following Formula 1:

[Formula 1]

In Formula 1, $R_1$ to $R_4$ are, each independently, hydrogen, a substituted or unsubstituted C1-C20 alkyl group, a substituted or unsubstituted C1-C20 heteroalkyl group, a substituted or unsubstituted C2-C20 alkenyl group, a substituted or unsubstituted C1-C20 alkoxy group, a substituted or unsubstituted C1-C20 alkylsulfoneamide group, a substituted or unsubstituted C6-C20 arylsulfoneamide group, a substituted or unsubstituted C1-C20 acylamino group, a C1-C20 alkylureido group, a C6-C20 arylureido group, a C2-C20 alkoxycarbonyl group, a C2-C20 alkoxycarbonylamino group, a carbamoyl group, a sulfamoyl group, a sulfo group and a salt thereof, a carboxyl group and a salt thereof, a substituted or unsubstituted C1-C20 hydroxyalkyloxyalkyl group, a substituted or unsubstituted C1-C20 dialkylaminoalkyl group, a substituted or unsubstituted C6-C20 pyridylalkyl group, a substituted or unsubstituted C5-C20 pyridyl group, a substituted or unsubstituted C6-C20 imidazolyl group, a hydrazine group, a hydrazone group, a substituted or unsubstituted C1-C20 pyridylalkyl group, a substituted or unsubstituted C6-C20 aryl group, a substituted or unsubstituted C6-C20 arylalkyl group, a substituted or unsubstituted C6-C20 heteroaryl group, a substituted or unsubstituted C6-C20 heteroarylalkyl group, a substituted or unsubstituted C6-C20 heteroarylalkenyl group, or a substituted or unsubstituted C3-C20 heterocycloalkyl group. $R_3$ and $R_4$ are connected to each other to form a substituted or unsubstituted C1-C20 alkylene group, in which at least one of the $R_1$ to $R_4$ includes an acrylate group or methacrylate group at one end thereof. Thus, the anti-intercolor bleed agent may be an amideacrylate compound or an amidemethacrylate compound.

In Formula 1, $R_3$ and $R_4$ may be connected to each other to form a substituted or unsubstituted C1-C10 alkylene group, thereby forming a 5 to 13 membered ring with —N(=O)—N—. Particularly, a 5 to 9 membered ring may be formed. The 5 to 9 membered ring may be represented by the following Formula 2.

[Formula 2]

In Formula 2, $R_1$ and $R_2$ are as defined with reference to Formula 1. At least one of $R_1$ and $R_2$ includes an acrylate group or methacrylate group at one end thereof, n is an integer of 2 to 6, m is an integer of 0 to 6, and X is hydrogen, a substituted or unsubstituted C1-C20 alkyl group, a substituted or unsubstituted C1-C20 heteroalkyl group, a substituted or unsubstituted C2-C20 alkenyl group, a substituted or unsubstituted C1-C20 alkoxy group, a substituted or unsubstituted C1-C20 alkylsulfoneamide group, a substituted or unsubstituted C6-C20 arylsulfoneamide group, a substituted or unsubstituted C1-C20 acrylamino group, a C1-C20 alkylureido group, a C6-C20 arylureido group, a C2-C20 alkoxycarbonyl group, a C2-C20 alkoxycarbonylamino group, a carbamoyl group, a sulfamoyl group, a sulfo group and a salt thereof, a carboxyl group and a salt thereof, a substituted or unsubstituted C1-C20 hydroxyalkyloxyalkyl group, a substituted or unsubstituted C1-C20 dialkylaminoalkyl group, a substituted or unsubstituted C6-C20 pyridylalkyl group, a substituted or unsubstituted C5-C20 pyridyl group, a substituted or unsubstituted C6-C20 imidazolyl group, a hydrazine group, a hydrazone group, a substituted or unsubstituted C1-C20 pyridylalkyl group, a substituted or unsubstituted C6-C20 aryl group, a substituted or unsubstituted C6-C20 arylalkyl group, a substituted or unsubstituted C6-C20 heteroaryl group, a substituted or unsubstituted C6-C20 heteroarylalkyl group, a substituted or unsubstituted C6-C20 heteroarylalkenyl group, or a substituted or unsubstituted C3-C20 heterocycloalkyl group. In this regard, when m is 0, other substituents such as a C1-C5 alkyl group are not bonded to —(CH$_2$)$_n$—, except for hydrogen.

The anti-intercolor bleed agent may be a cycloamine compound, particularly, a hetero cycloamine acrylate or methacrylate compound. The hetero cycloamine compound may be an aromatic or non-aromatic C4-C12 hetero cycloamine compound, particularly, an aromatic or non-aromatic C4-C10 hetero cycloamine compound. For example, the cycloamine compound may be a pyrrole derivative, a pyridine derivative, a quinoline derivative, an isoquinoline derivative, a pyrrolidine derivative, and a piperidine derivative. These derivatives may be compounds in which hydrogen is substituted with a hydroxyl group, a substituted or unsubstituted C1-C15 alkylene group, a substituted or unsubstituted heteroalkylene group, a substituted or unsubstituted arylene group, a substituted or unsubstituted heteroarylene group, a halogen atom, an amino group, a nitro group, or the like. For example, hydroxyl piperidine, methyl pyrrolidine, methyl piperidine, methyl pyridine, amino pyridine, bromo pyridine, chloro pyridine, nitro quinoline, nitro isoquinoline, amino quinoline, and methyl isoquinoline may be used.

The first colorant of the first ink composition including the anti-intercolor bleed agent may be a dye, a pigment, a self-dispersing pigment, or any mixture thereof. Examples of the dye include food black dyes, food red dyes, food yellow dyes, food blue dyes, acid black dyes, acid red dyes, acid blue dyes, acid yellow dyes, direct black dyes, direct blue dyes, direct yellow dyes, anthraquinone dyes, momoazo dyes, disazo dyes, and phthalocyanine dyes.

Examples of the pigment include carbon block, graphite, virteous carbon, activated charcoal, activated carbon, anthraquinone, phthalocyanine blue, phthalocyaniene green, diazos, monoazos, pyranthrones, perylene, quinacridone, and indigoid pigments, without being limited thereto.

The second colorant of the second ink composition may be an acid colorant having an acid moiety involved in a reaction with the anti-intercolor bleed agent of the first ink composition to be precipitated. The acid moiety may be a carboxylate group, a sulfonate group, a phosphate group, or a salt thereof and one molecule of the colorant may include at least one acid moiety. Since aggregates may be generated due to electrostatic attraction between the amide moiety (or cycloamine moiety) of the anti-intercolor bleed agent contained in the first ink composition and the acid moiety of the second colorant contained in the second ink composition, fluidity is reduced at an interface between the first ink composition and the second ink composition, so that intercolor bleeding therebetween may be decreased. Since the second colorant may be cross-linked with the photocurable material contained in the first ink composition by the acrylate group or methacrylate group contained in the anti-intercolor bleed agent, deterioration of physical properties of a shaped product caused via application of the anti-intercolor bleed agent may be minimized.

A content of a contained in the first colorant or the second colorant for 3D printing may be in the range of about 0.01 to about 1% by weight based on a weight of the first ink composition or the second ink composition.

The first ink composition includes the anti-intercolor bleed agent in an amount about 0.5 to about 10 times molar ratio of the acid moiety of the second colorant contained in the second ink composition.

The multi-color ink for 3D printing according to an embodiment of the present disclosure may be applied to a material jetting method using a thermal head or a piezo head.

Particularly, when using the thermal head, at least one of the first and second ink compositions may include a co-solvent to improve jetting performance by decreasing viscosity and generating bubbles.

Organic solvents may be generally used as the co-solvent, and the co-solvent uniformly mixes the ink compositions and adjusts physical properties (viscosity) to obtain sufficient jetting performance. The co-solvent may be selected from the group of an alcohol compound such as methyl alcohol, ethyl alcohol, n-propyl alcohol, isopropyl alcohol, n-butyl alcohol, sec-butyl alcohol, t-butyl alcohol, or isobutyl alcohol; a ketone compound such as acetone, methyl ketone, diethyl ketone, or diacetone alcohol; an ester compound such as methyl acetate, ethyl acetate, or ethyl lactate; a polyhydric alcohol compound such as ethylene glycol, diethylene glycol, triethylene glycol, propylene glycol, butylene glycol, 1,4-butanediol, 1,2,4-butanetriol, 1,5-pentanediol, 1,2,6-hexanetriol, hexylene glycol, glycerol, glycerol ethoxylate, or polyhydric alcohol of trimethylolpropane ethoxylate; a nitrogen-containing compound such as 2-pyrrolidone or N-methyl-2-pyrrolidone; and a sulfur-containing compound such as dimethyl sulfoxide, tetramethylene sulfone, or thio glycol, without being limited thereto.

Exemplary embodiments of the present disclosure are be described in further detail with reference to the following examples. However, these examples and comparative examples are for illustrative purposes only and are not intended to limit the scope of the invention.

Colorants, photocurable materials, photoinitiators, anti-intercolor bleed agents, and other additives may be mixed to prepare 100 g of each ink set. The mixtures may be sufficiently stirred, for example, for 30 minutes or more, to prepare homogenous mixtures. Each ink set may include a first ink composition and a second ink composition and % refers to % by weight. Miramer PS420, Miramer PU210, and Miramer PU340 are products of Miwon Specialty Chemical Co., Ltd. CN2300, CN2301, CN1963, and CN9009 are products, for example, of Sartomer Company. Photoinitiators are products, for example, of BASF Corporation. Other compounds are products, for example, of Aldrich Co.

EXAMPLE 1

| Ink set 1 | Photocurable material | Photoinitiator | Colorant | Anti-intercolor bleed agent | Co-solvent |
| --- | --- | --- | --- | --- | --- |
| First ink composition | isooctyl acrylate (20%) 2-phenoxy ethyl acrylate (17%) 1,3-butylene glycol dimethacrylate (10%) CN1963 (20%) | Irgacure 184 (8%) | Pigment Black 7 (1%) | 4-3-methacryloyl propylpyridine (4%) | Methanol (20%) |
| Second ink composition | isooctyl acrylate (20%) benzyl acrylate (25%) tetraethylene glycol diacrylate (15%) CN9009 (10%) | Irgacure 754 (7%) Irgacure 819 (1%) | Pigment Yellow 183 (2%) | — | methanol (20%) |

EXAMPLE 2

| Ink set 2 | Photocurable material | Photoinitiator | Colorant | Anti-intercolor bleed agent | Co-solvent |
|---|---|---|---|---|---|
| First ink composition | isooctyl acrylate (15%) 2-phenoxyethyl acrylate (30%) tetraethylene glycol diacrylate (20%) Miramer PU210 (22%) | Irgacure 184 (4%) Darocur 1173 (3%) | Pigment Blue 15:3 (1%) | 4-3-acryloylpropyl pyridine (5%) | — |
| Second ink composition | isooctyl acrylate (18%) ethoxy ethoxy ethyl acrylate (30%) tripropylene glycol diacrylate (25%) Miramer PU340 (20%) | Irgacure 184 (4%) Irgacure 907 (2%) | Pigment Red 57:1 (1%) | — | — |

EXAMPLE 3

| Ink set 3 | Photocurable material | Photoinitiator | Colorant | Anti-intercolor bleed agent | Co-solvent |
|---|---|---|---|---|---|
| First ink composition | lauryl acrylate (18%) dipropylene glycol diacrylate (16%) tricyclodecane dimethanol diacrylate (35%) | Irgacure 184 (5%) | Pigment Black 7 (0.01%) | 4-3-methacryloyl propyl pyridine (0.35%) | methanol (25.64%) |
| Second ink composition | ethoxy ethoxy ethyl acrylate (25%) tripropylene glycol diacrylate (15%) tricyclodecane dimethanol diacrylate (30%) | Irgacure 754 (5%) Irgacure 819 (1%) | Pigment Yellow 183 (0.05%) | — | ethanol (23.95%) |

COMPARATIVE EXAMPLE 1

| Ink set 4 | Photocurable material | Photoinitiator | Colorant | Anti-intercolor bleed agent | Co-solvent |
|---|---|---|---|---|---|
| First ink composition | isooctyl acrylate (25%) 2-phenoxyethyl acrylate (22%) 1,3-butylene glycol dimethacrylate (10%) Miramer PS420 (10%) | Irgacure 184 (8%) | Pigment Black 7 (2%) | — | methanol (13%) methyl ethyl ketone (10%) |
| Second ink composition | isooctyl acrylate (20%) benzyl acrylate (25%) tetraethlene glycol diacrylate (15%) CN2300 (10%) | Irgacure 754 (7%) Irgacure 819 (1%) | Pigment Yellow 183 (2%) | — | methanol (10%) methyl ethyl ketone (10%) |

EXPERIMENTAL EXAMPLE 1

Storage Stability of Ink 100 mL of each of the first ink compositions and second ink compositions prepared according to Examples 1 to 3 and Comparative Example 1 were added to a heat-resistant glass bottle and the glass bottle was sealed and stored at room temperature for 3 months. The existence of precipitates and layer separation were evaluated as follows. The results are shown in the following Table 1 where the following symbols are used to respectively indicate:

○: No precipitates and no layer separation
x: Precipitates or layer separation

EXPERIMENTAL EXAMPLE 2

Intercolor Bleeding

The first ink compositions and second ink compositions prepared according to Examples 1 to 3 and Comparative Example 1 were jetted on the same layer to be adjacent to each other during a 3D printing process. Intercolor bleeding at the interface between the first and second ink compositions was evaluated as follows. The results are shown in Table 1 below where the following symbols are used to respectively indicate:
  ○: No intercolor bleeding
  Δ: Slight intercolor bleeding
  x: Serious intercolor bleeding

TABLE 1

|  | Example 1 | Example 2 | Example 3 | Comparative Example 1 |
|---|---|---|---|---|
| Storage stability | o/o | o/o | o/o | o/o |
| Intercolor bleeding | ○ | ○ | ○ | x |

As indicated in Table 1, it may be confirmed that intercolor bleeding was not observed in the ink sets according to Examples 1 to 3 including the anti-intercolor bleed agent compared to the ink set according to Comparative Example 1 not including the anti-intercolor bleed agent. Thus, according to exemplary embodiments of the present disclosure, intercolor bleeding may be reduced at an interface between inks with different colors on the same layer during 3D printing, thereby realizing a clear image.

Embodiments of the present disclosure are described in more detail with reference to the accompanying drawings.

Figure 1:
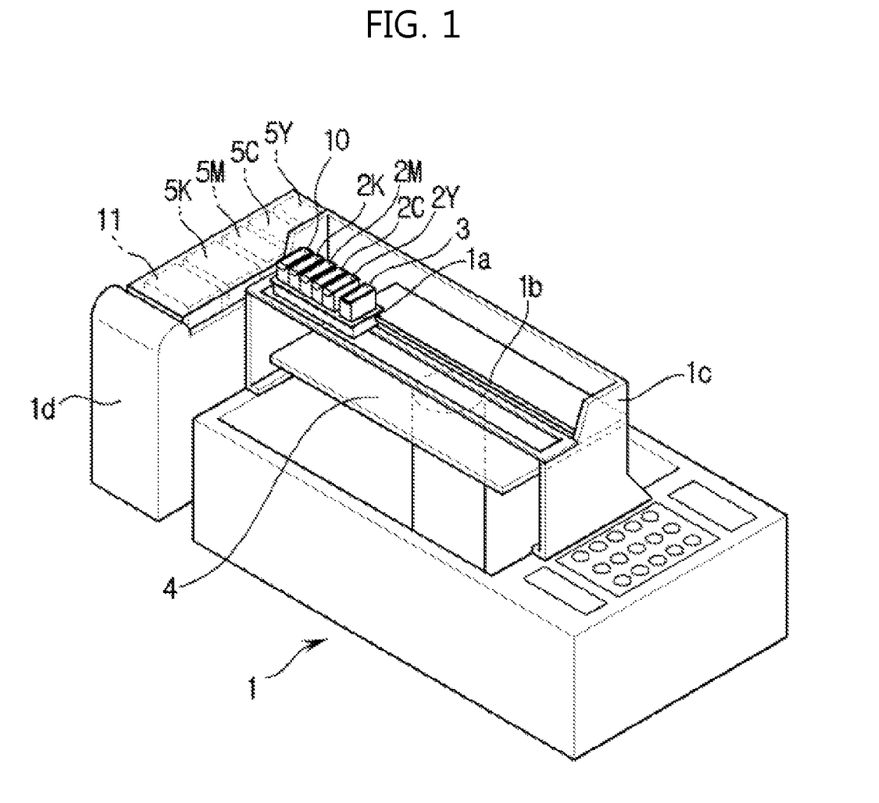
FIG. 1 is a perspective view illustrating a 3D printer according to an embodiment of the present disclosure.

FIG. 1 is a perspective view illustrating a 3D printer according to an embodiment of the present disclosure.

As illustrated in FIG. 1, the 3D printer according to an embodiment includes a main body 1, a plurality of print heads 2K, 2C, 2M, 2Y, and 10, which may disposed at upper portions of the main body 1, and configured to eject ink compositions, for example, downward. Also illustrated are a stage 4, on which the ink compositions ejected from the plurality of print heads 2K, 2C, 2M, 2Y, and 10 may be stacked, a light source 3 configured to emit light to the ink compositions stacked on the stage 4 to cure the ink compositions, and a plurality of ink tanks 5K, 5M, 5C, 5Y, and 11 configured to supply the ink compositions to the print heads 2K, 2C, 2M, 2Y, and 10. The first ink composition and second ink composition may be accommodated in the print heads 2K, 2C, 2M, 2Y, and 10, respectively. Print heads accommodating first compositions, which are ink compositions stacked on the stage 4, are defined as first print heads 2K, 2C, 2M, and 2Y. A print head accommodating a second composition including the anti-intercolor bleed agent to prevent intercolor bleeding among the first compositions may be defined as a second print head 10. The second print head 10 may accommodate the second composition including the anti-intercolor bleed agent, without being limited thereto. The second print head 10 may also accommodate additives used to eject the anti-intercolor bleed agent in addition to the anti-intercolor bleed agent. That is, the anti-intercolor bleed agent may be accommodated in the second print head 10. Since the second ink composition including the second colorant may not include the anti-intercolor bleed agent, the second ink composition may be regarded as a first composition and accommodated in a first print head.

According to an exemplary embodiment, the first compositions and the second composition including the anti-intercolor bleed agent may be respectively accommodated in the first print heads 2K, 2C, 2M, and 2Y and the second print head 10. However, the embodiment is not limited thereto, and the first composition and the anti-intercolor bleed agent may be accommodated in one print head. In this case, when the first composition is ejected, the anti-intercolor bleed agent may be simultaneously ejected. Intercolor bleeding between the inks may be inhibited via a reaction between the anti-intercolor bleed agent and the colorant.

The main body 1 includes a transport module 1a on which the print heads 2K, 2C, 2M, 2Y, and 10 and the light source 3 may be mounted, a guide, for example, a guide rail 1b extending in a first direction and configured to guide the movement of the transport module 1a in the first direction, and a support bracket 1c configured to support both ends of the guide rail 1b. An ink accommodation unit 1d, on which the plurality of ink tanks 5K, 5N, 5C, 5Y, and 11 are detachably mounted, may be disposed at one portion of the main body 1.

Figure 2:
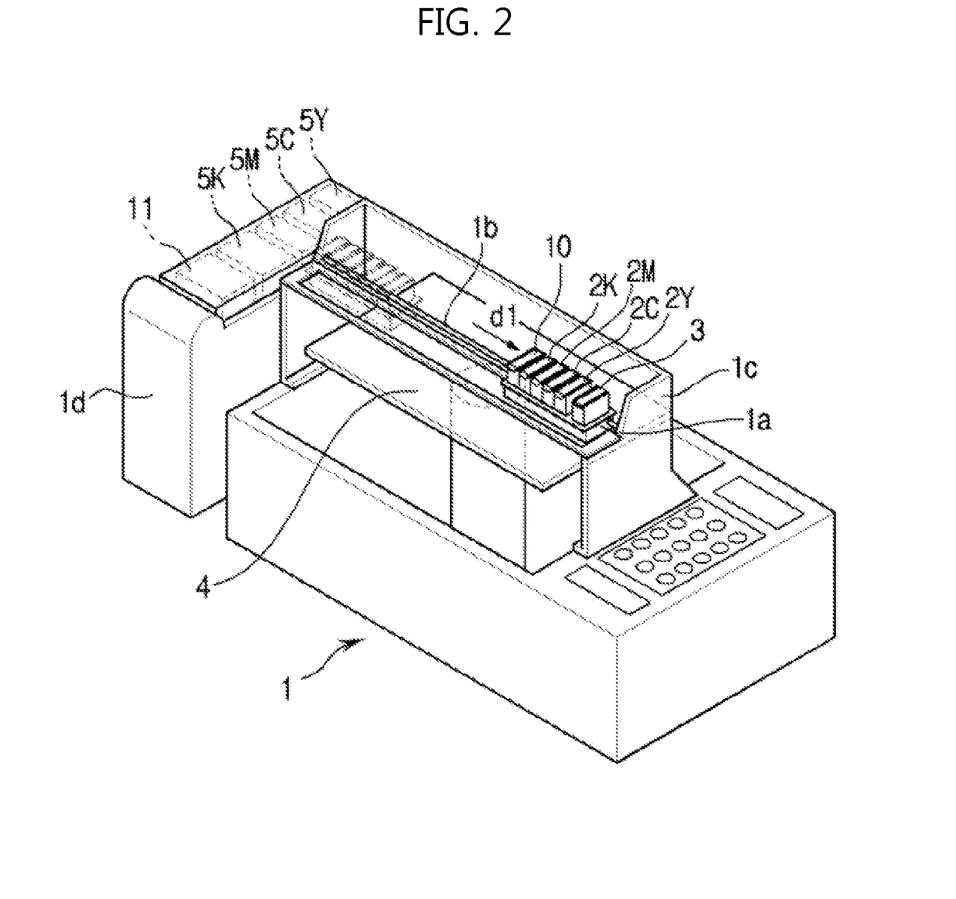
FIG. 2 is a perspective view illustrating a 3D printer according to an embodiment of the present disclosure in which a print head is moved in a first direction.

FIG. 2 is a perspective view illustrating the 3D printer according to an exemplary embodiment in which a print head is moved in a first direction.

As illustrated in FIG. 2, the print heads 2K, 2M, 2C, 2Y, and 10 may be mounted on the main body 1 to be, for example, horizontally moved in a first direction d1, for example, by the transport module 1a and the guide rail 1b.

The first print heads 2K, 2M, 2C, and 2Y include a print head 2K to eject a black ink composition, a print head 2M to eject a magenta ink composition, a print head 2C to eject a cyan ink composition, and a print head 2Y to eject a yellow ink composition. The second print head 10 accommodates the anti-intercolor bleed agent. According to an exemplary embodiment, one second print head 10 may be used. However, a plurality of the second print heads 10 may be used. The second print heads 10 may be disposed between every two of the first print heads 2K, 2M, 2C, and 2Y.

The print heads 2K, 2M, 2C, 2Y, and 10 include head chips (not shown) configured to eject the ink compositions onto the stage 4 and disposed, for example, on the bottom surface of each of the print heads 2K, 2M, 2C, 2Y, and 10.

Figure 3:
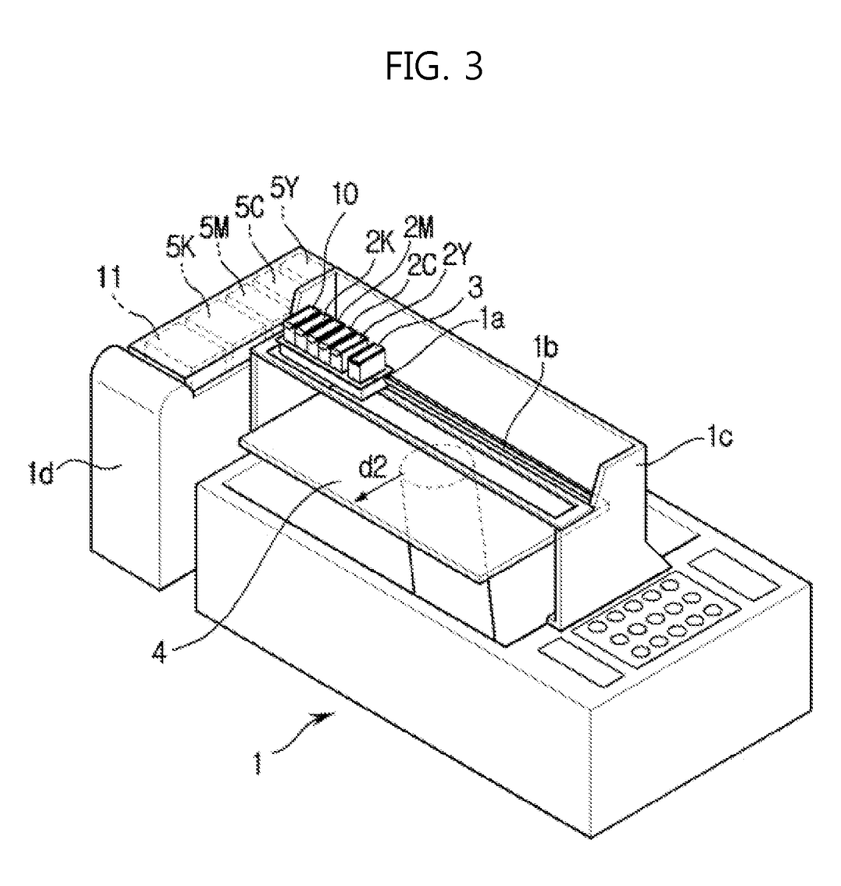
FIG. 3 is a perspective view illustrating a 3D printer according to an embodiment of the present disclosure in which a stage is moved in a second direction.
Figure 4:
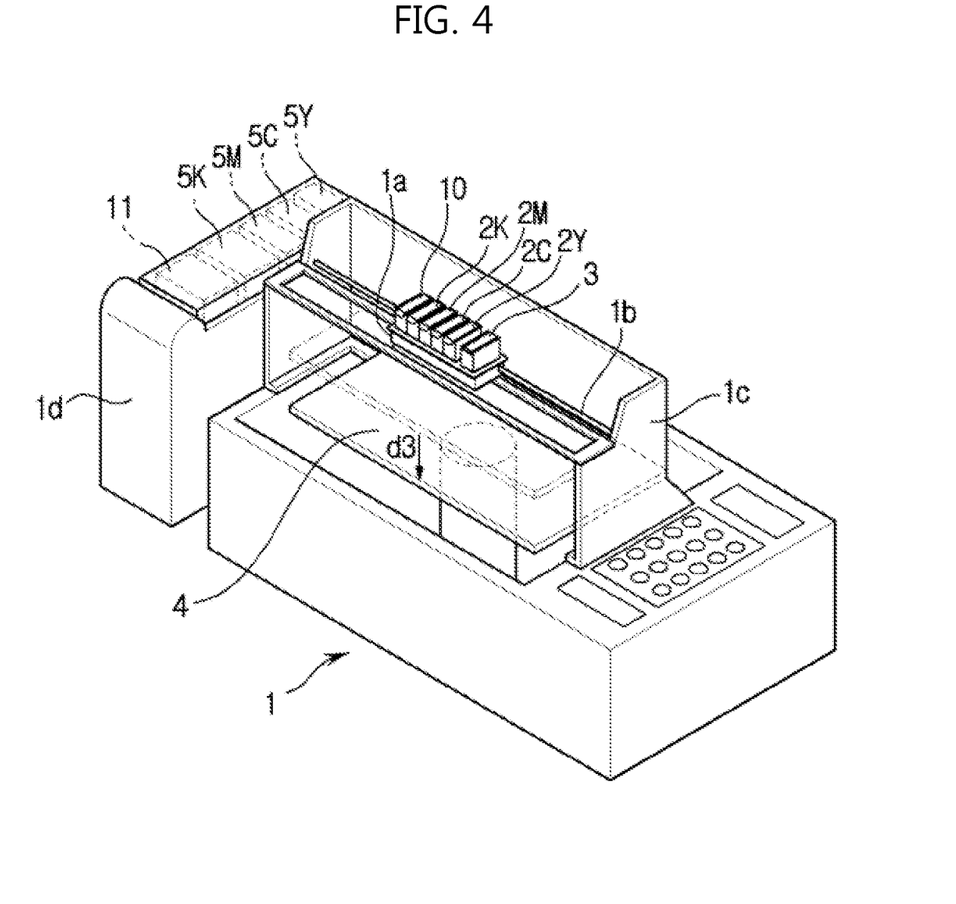
FIG. 4 is a perspective view illustrating a 3D printer according to an embodiment of the present disclosure in which a stage is moved in a third direction.

FIG. 3 is a perspective view illustrating the 3D printer in which the stage is moved in a second direction. FIG. 4 is a perspective view illustrating the 3D printer in which the stage is moved in a third direction.

As illustrated in FIG. 3, the stage 4 may be formed, for example, in a flat plate shape horizontally disposed, and may be installed movably in a second direction d2, which is a horizontal direction, perpendicular to the first direction d1. The stage 4 may be installed movably in a third direction d3, which is a vertical direction, as illustrated in FIG. 4.

Thus, a 3D object having a length, a width, and a height may be manufactured on the stage 4 by combining operations of the print heads 2K, 2M, 2C, 2Y, and 10, which may move in the first direction d1, and operations of the stage 4, which may move in the second direction d2 and third direction d3.

The light source 3 may be mounted on the transport module 1a together with the print heads 2K, 2M, 2C, 2Y, and 10 and emit light toward ink compositions ejected from the print heads 2K, 2M, 2C, 2Y, and 10, for example, while moving with the print heads 2K, 2M, 2C, 2Y, and 10 in the first direction d1.

The light source 3 may be a UV lamp that generates UV rays and emits the UV rays toward the stage 4. The ink compositions may be UV-curable ink compositions that are cured by UV rays.

The light source 3 according to an exemplary embodiment may be a light-emitting diode (LED) type UV lamp. An LED type UV lamp may be mounted on the transport module 1a together with the print heads 2K, 2M, 2C, 2Y, and 10 since the LED type UV lamp consumes low power due to low heat generation and has a small size.

The plurality of ink tanks 5K, 5M, 5C, 5Y, and 11 include an ink tank 5K to store the black ink composition to be supplied to the 1-1 print head 2K, an ink tank 5M to store the magenta ink composition to be supplied to the 1-2 print head 2M, an ink tank 5C to store the cyan ink composition to be supplied to the 1-3 print head 2C, and an ink tank 5Y to store the yellow ink composition to be supplied to the print head 2Y. The plurality of ink tanks 5K, 5M, 5C, 5Y, and 11 may store the second composition including the anti-intercolor bleed agent to be supplied to the second print head 10.

The ink tanks 5K, 5M, 5C, 5Y, and 11 may be detachably mounted on the ink accommodation unit 1d disposed at one portion of the main body 1 and supply the compositions to the print heads 2K, 2M, 2C, 2Y, and 10, for example, via connection pipes (not shown).

Since the ink tanks 5K, 5M, 5C, 5Y, and 11 may be detachably mounted on the main body 1 separately from the print heads 2K, 2M, 2C, 2Y, and 10, large amounts of the ink compositions may be stored in the ink tanks 5K, 5M, 5C, 5Y, and 11 by increasing the sizes thereof. In addition, after the ink compositions are used up, the ink tanks 5K, 5M, 5C, 5Y, and 11 may be easily replaced.

The print heads 2K, 2M, 2C, 2Y, and 10 may independently eject the compositions, and the print heads 2K, 2M, 2C, 2Y, and 10 may selectively operate and eject inks in accordance with color to be realized. The second print head 10 that accommodates the second composition including the anti-intercolor bleed agent may eject the second composition, optionally. Accordingly, the anti-intercolor bleed agent to prevent intercolor bleeding between the first compositions may be ejected only when required.

The ink compositions having photocurable properties and ejected onto the stage 4 may be cured by light emitted by the light source 3 while being moved by the transport module 1a in the first direction d1.

The ejecting and curing of the ink compositions may be repeatedly performed while the transport module 1a moves in the first direction 1, as illustrated in FIG. 2, thereby forming a line in the first direction d1.

The line formation may be repeated while the stage 4 is moved in the second direction d2, for example, by a predetermined distance as illustrated in FIG. 3, thereby forming a plane. After the plane is formed, the plane formation may be repeated while the stage 4 is moved in the third direction d3, for example, by a predetermined distance as illustrated in FIG. 4, thereby completing manufacture of the 3D object.

According to an exemplary embodiment, the 3D printer includes the print head 2K, the print head 2M, the print head 2C, and the print head 2Y respectively ejecting the black, magenta, cyan, and yellow ink compositions. However, embodiments of the present disclosure are not limited thereto, and the 3D printer may selectively include one or a plurality of print heads among the four first print heads 2K, 2M, 2C, and 2Y and one second print head 10 in accordance with the color of the 3D object to be manufactured.

The stage 4 may be vertically moved according to an exemplary embodiment. However, embodiments of the present disclosure are not limited thereto, and the print heads 2K, 2M, 2C, 2Y, and 10 may also be vertically moved instead of the stage 4.

According to an exemplary embodiment, the first compositions may be supplied to the first print heads, the second composition including the anti-intercolor bleed agent to prevent intercolor bleeding among the first compositions may be supplied to the second print head, and the compositions supplied to the first and second print heads may be selectively ejected. Accordingly, the second composition including the anti-intercolor bleed agent may be accommodated in a separate print head without being mixed with the first compositions, which are ink compositions. The second composition may be ejected only when required. Thus, amounts of the compositions used during printing may be reduced.

Thus, according to an exemplary embodiment, the multi-color ink for 3D printing may enable a clear image by inhibiting intercolor bleeding that occurs when ink compositions with different colors are printed to be adjacent to each other before curing during 3D printing.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A multi-color ink for 3D printing comprising:
a plurality of ink compositions comprising a first ink composition and a second ink composition,
wherein the first ink composition comprises:
at least one photocurable material,
a photoinitiator configured to cure the photocurable material;
a first colorant, and
an anti-intercolor bleed agent configured to prevent intercolor bleeding occurring when the plurality of ink compositions come into contact with each other, and
the second ink composition comprises:
at least one photocurable material,
a photoinitiator configured to cure the photocurable material; and
a second colorant having an acid moiety involved in a reaction with the anti-intercolor bleed agent to cause aggregation.

2. The multi-color ink for 3D printing according to claim 1, wherein the anti-intercolor bleed agent is an amide compound represented by Formula 1:

[Formula 1]

wherein $R_1$ to $R_4$ are, each independently, hydrogen, a substituted or unsubstituted $C_1$-$C_{20}$ alkyl group, a substituted or unsubstituted $C_1$-$C_{20}$ heteroalkyl group, a substituted or unsubstituted $C_2$-$C_{20}$ alkenyl group, a substituted or unsubstituted $C_1$-$C_{20}$ alkoxy group, a substituted or unsubstituted $C_1$-$C_{20}$ alkylsulfoneamide group, a substituted or unsubstituted $C_6$-$C_{20}$ arylsulfoneamide group, a substituted or unsubstituted $C_1$-$C_{20}$ acylamino group, a $C_1$-$C_{20}$ alkylureido group, a $C_6$-$C_{20}$ arylureido group, a $C_2$-$C_{20}$ alkoxycarbonyl group, a $C_2$-$C_{20}$ alkoxycarbonylamino group, a carbamoyl group, a sulfamoyl group, a sulfo group and a salt thereof, a carboxyl group and a salt thereof, a substituted or unsubstituted $C_1$-$C_{20}$ hydroxyalkyloxyalkyl group, a substituted or unsubstituted $C_1$-$C_{20}$ dialkylaminoalkyl group, a substituted or unsubstituted $C_6$-$C_{20}$ pyridylalkyl group, a substituted or unsubstituted $C_5$-$C_{20}$ pyridyl group, a substituted or unsubstituted $C_6$-$C_{20}$ imidazolyl group, a hydrazine group, a hydrazone group, a substituted or unsubstituted $C_1$-$C_{20}$ pyridylalkyl group, a substituted or unsubstituted $C_6$-$C_{20}$ aryl group, a substituted or unsubstituted $C_6$-$C_{20}$ arylalkyl group, a substituted or unsubstituted $C_6$-$C_{20}$ heteroaryl group, a substituted or unsubstituted $C_6$-$C_{20}$ heteroarylalkyl group, a substituted or unsubstituted $C_6$-$C_{20}$ heteroarylalkenyl group, or a substituted or unsubstituted $C_3$-$C_{20}$ heterocycloalkyl group, and $R_3$ and $R_4$ are connected to each other to form a substituted or unsubstituted $C_1$-$C_{20}$ alkylene group, wherein at least one of the $R_1$ to $R_4$ comprises an acrylate group or methacrylate group at one end thereof.

3. The multi-color ink for 3D printing according to claim 2, wherein the anti-intercolor bleed agent is an amide compound represented by Formula 2:

[Formula 2]

wherein $R_1$ and $R_2$ are each independently hydrogen, a substituted or unsubstituted $C_1$-$C_{20}$ alkyl group, a substituted or unsubstituted $C_1$-$C_{20}$ heteroalkyl group, a substituted or unsubstituted $C_2$-$C_{20}$ alkenyl group, a substituted or unsubstituted $C_1$-$C_{20}$ alkoxy group, a substituted or unsubstituted $C_1$-$C_{20}$ alkylsulfoneamide group, a substituted or unsubstituted $C_6$-$C_{20}$ arylsulfoneamide group, a substituted or unsubstituted $C_1$-$C_{20}$ acylamino group, a $C_1$-$C_{20}$ alkylureido group, a $C_6$-$C_{20}$ arylureido group, a $C_2$-$C_{20}$ alkoxycarbonyl group, a $C_2$-$C_{20}$ alkoxycarbonylamino group, a carbamoyl group, a sulfamoyl group, a sulfo group and a salt thereof, a carboxyl group and a salt thereof, a substituted or unsubstituted $C_1$-$C_{20}$ hydroxyalkyloxyalkyl group, a substituted or unsubstituted $C_1$-$C_{20}$ dialkylaminoalkyl group, a substituted or unsubstituted $C_6$-$C_{20}$ pyridylalkyl group, a substituted or unsubstituted $C_5$-$C_{20}$ pyridyl group, a substituted or unsubstituted $C_6$-$C_{20}$ imidazolyl group, a hydrazine group, a hydrazone group, a substituted or unsubstituted $C_1$-$C_{20}$ pyridylalkyl group, a substituted or unsubstituted $C_6$-$C_{20}$ aryl group, a substituted or unsubstituted $C_6$-$C_{20}$ arylalkyl group, a substituted or unsubstituted $C_6$-$C_{20}$ heteroaryl group, a substituted or unsubstituted $C_6$-$C_{20}$ heteroarylalkyl group, a substituted or unsubstituted $C_6$-$C_{20}$ heteroarylalkenyl group, or a substituted or unsubstituted $C_3$-$C_{20}$ heterocycloalkyl group, wherein at least one of $R_1$ and $R_2$ comprises an acrylate group or methacrylate group at one end thereof, n is an integer of 2 to 6, m is an integer of 0 to 6, X is hydrogen, a substituted or unsubstituted $C_1$-$C_{20}$ alkyl group, a substituted or unsubstituted $C_1$-$C_{20}$ heteroalkyl group, a substituted or unsubstituted $C_2$-$C_{20}$ alkenyl group, a substituted or unsubstituted $C_1$-$C_{20}$ alkoxy group, a substituted or unsubstituted $C_1$-$C_{20}$ alkylsulfoneamide group, a substituted or unsubstituted $C_6$-$C_{20}$ arylsulfoneamide group, a substituted or unsubstituted $C_1$-$C_{20}$ acrylamino group, a $C_1$-$C_{20}$ alkylureido group, a $C_6$-$C_{20}$ arylureido group, a $C_2$-$C_{20}$ alkoxycarbonyl group, a $C_2$-$C_{20}$ alkoxycarbonylamino group, a carbamoyl group, a sulfamoyl group, a sulfo group and a salt thereof, a carboxyl group and a salt thereof, a substituted or unsubstituted $C_1$-$C_{20}$ hydroxyalkyloxyalkyl group, a substituted or unsubstituted $C_1$-$C_{20}$ dialkylaminoalkyl group, a substituted or unsubstituted $C_6$-$C_{20}$ pyridylalkyl group, a substituted or unsubstituted $C_5$-$C_{20}$ pyridyl group, a substituted or unsubstituted $C_6$-$C_{20}$ imidazolyl group, a hydrazine group, a hydrazone group, a substituted or unsubstituted $C_1$-$C_{20}$ pyridylalkyl group, a substituted or unsubstituted $C_6$-$C_{20}$ aryl group, a substituted or unsubstituted $C_6$-$C_{20}$ arylalkyl group, a substituted or unsubstituted $C_6$-$C_{20}$ heteroaryl group, a substituted or unsubstituted $C_6$-$C_{20}$ heteroarylalkyl group, a substituted or unsubstituted $C_6$-$C_{20}$ heteroarylalkenyl group, or a substituted or unsubstituted $C_3$-$C_{20}$ heterocycloalkyl group.

4. The multi-color ink for 3D printing according to claim 1, wherein the anti-intercolor bleed agent is a cycloamine compound.

5. The multi-color ink for 3D printing according to claim 4, wherein the cycloamine compound is a pyrrole derivative, a pyridine derivative, a quinoline derivative, an isoquinoline derivative, a pyrrolidine derivative, or a piperidine derivative.

6. The multi-color ink for 3D printing according to claim 1, wherein the acid moiety of the second colorant is a carboxylate group, a sulfonate group, a phosphate group, or a salt thereof.

7. The multi-color ink for 3D printing according to claim 1, wherein a content of at least one of the first colorant and the second colorant is in the range of about 0.01 to about 1% by weight based on a weight of the first ink composition or the second ink composition.

8. The multi-color ink for 3D printing according to claim 1, wherein the anti-intercolor bleed agent is contained in an amount about 0.5 to about 10 times molar ratio of the acid moiety of the second colorant.

9. The multi-color ink for 3D printing according to claim 1, wherein the photocurable material is an acrylate-based or methacrylate-based compound having at least one unsaturated functional group.

10. The multi-color ink for 3D printing according to claim 9, wherein the photocurable material comprises at least one compound selected from the group consisting of a hydroxyl group-containing acrylate-based compound, a water-soluble acrylate-based compound, a polyester acrylate-based compound, a polyurethane acrylate-based compound, an epoxy acrylate-based compound, and a caprolactone-modified acrylate-based compound.

11. The multi-color ink for 3D printing according to claim 1, wherein at least one of the first ink composition and the second ink composition further comprises a co-solvent.

12. The multi-color ink for 3D printing according to claim 1, wherein at least one of the first colorant and the second colorant comprises a dye, a pigment, a self-dispersing pigment, or a mixture thereof.

13. A multi-color ink for 3D printing comprising a plurality of ink compositions, wherein at least a first of the plurality of ink compositions include:
at least one photocurable material having an acrylate or methacrylate functional group, a photoinitiator configured to cure the photocurable material,
a first colorant, and
an anti-intercolor bleed agent that prevents an intercolor bleeding occurring when at least two of the plurality of ink compositions come into contact with each other in the 3D printing; and
at least a second of the plurality of ink compositions include a second colorant having an acid moiety reactable with the anti-intercolor bleed agent in the 3D printing.

14. The multi-color ink for 3D printing according to claim 13, wherein the anti-intercolor bleed agent is an amide compound represented by Formula 1:

[Formula 1]

wherein $R_1$ to $R_4$ are, each independently, hydrogen, a substituted or unsubstituted $C_1$-$C_{20}$ alkyl group, a substituted or unsubstituted $C_1$-$C_{20}$ heteroalkyl group, a substituted or unsubstituted $C_1$-$C_{20}$ alkenyl group, a substituted or unsubstituted $C_1$-$C_{20}$ alkoxy group, a substituted or unsubstituted $C_1$-$C_{20}$ alkylsulfoneamide group, a substituted or unsubstituted $C_6$-$C_{20}$ arylsulfoneamide group, a substituted or unsubstituted $C_1$-$C_{20}$ acylamino group, a $C_1$-$C_{20}$ alkylureido group, a $C_6$-$C_{20}$ arylureido group, a $C_2$-$C_{20}$ alkoxycarbonyl group, a $C_2$-$C_{20}$ alkoxycarbonylamino group, a carbamoyl group, a sulfamoyl group, a sulfo group and a salt thereof, a carboxyl group and a salt thereof, a substituted or unsubstituted $C_1$-$C_{20}$ hydroxyalkyloxyalkyl group, a substituted or unsubstituted $C_1$-$C_{20}$ dialkylaminoalkyl group, a substituted or unsubstituted $C_6$-$C_{20}$ pyridylalkyl group, a substituted or unsubstituted $C_5$-$C_{20}$ pyridyl group, a substituted or unsubstituted $C_6$-$C_{20}$ imidazolyl group, a hydrazine group, a hydrazone group, a substituted or unsubstituted $C_1$-$C_{20}$ pyridylalkyl group, a substituted or unsubstituted $C_6$-$C_{20}$ aryl group, a substituted or unsubstituted $C_6$-$C_{20}$ arylalkyl group, a substituted or unsubstituted $C_6$-$C_{20}$ heteroaryl group, a substituted or unsubstituted $C_6$-$C_{20}$ heteroarylalkyl group, a substituted or unsubstituted $C_6$-$C_{20}$ heteroarylalkenyl group, or a substituted or unsubstituted $C_6$-$C_{20}$ heterocycloalkyl group, and
$R_3$ and $R_4$ are connected to each other to form a substituted or unsubstituted $C_1$-$C_{20}$ alkylene group, wherein at least one of the $R_1$ to $R_4$ comprises an acrylate group or methacrylate group at one end thereof.

15. The multi-color ink for 3D printing according to claim 13, wherein the anti-intercolor bleed agent is a cycloamine compound.

16. The multi-color ink for 3D printing according to claim 15, wherein the cycloamine compound is a pyrrole derivative, a pyridine derivative, a quinoline derivative, an isoquinoline derivative, a pyrrolidine derivative, or a piperidine derivative.

17. The multi-color ink for 3D printing according to claim 13, wherein the photocurable material is a copolymer formed via polymerization of at least two types of acrylate or methacrylate monomers.

18. The multi-color ink for 3D printing according to claim 13, wherein the one or more ink compositions further comprise a solvent.

19. The multi-color ink for 3D printing according to claim 13, wherein the first colorant is a dye, a pigment, a self-dispersing pigment, or a mixture thereof.

20. The multi-color ink for 3D printing according to claim 13, wherein the second colorant is reactable with the anti-intercolor bleed agent to generate aggregates.

21. The multi-color ink for 3D printing according to claim 20, wherein the acid moiety of the second colorant is a carboxylate group, a sulfonate group, a phosphate group, or a salt thereof.

22. The multi-color ink for 3D printing according to claim 20, wherein a content of the second colorant is in the range of about 0.01 to about 1% by weight based on the at least the second of the plurality of ink compositions, and a molar ratio of the anti-intercolor bleed agent to the acid moiety of the second colorant is about 0.5:1 to about 10:1.

* * * * *